United States Patent [19]

Lakotish

[11] Patent Number: 5,264,122
[45] Date of Patent: Nov. 23, 1993

[54] STATIONARY SURFACE POOL CLEANER

[75] Inventor: George Lakotish, Farmington Hills, Mich.

[73] Assignee: 21st Century Pool Technology, Livonia, Mich.

[21] Appl. No.: 850,697

[22] Filed: Mar. 11, 1992

[51] Int. Cl.$^5$ .............................................. B01D 35/05
[52] U.S. Cl. ................... 210/169; 210/242.1; 210/416.2; 15/1.7; 4/490
[58] Field of Search ............ 210/169, 241, 242.1, 210/242.2, 416.2, 923; 15/1.7; 4/490

[56] References Cited

U.S. PATENT DOCUMENTS

| | | | |
|---|---|---|---|
| 3,860,518 | 1/1975 | Hendricksen | 210/169 |
| 4,053,412 | 10/1977 | Stix | 210/169 |
| 4,059,526 | 11/1977 | Middlebeek | 210/923 |
| 4,089,074 | 5/1978 | Sermons | 210/169 |
| 4,305,830 | 12/1981 | Shimura | 210/923 |
| 4,451,379 | 5/1984 | Levy | 210/169 |
| 4,746,424 | 5/1988 | Drew | 210/169 |
| 4,889,622 | 12/1989 | Newcombe-Bond | 210/169 |
| 4,994,178 | 2/1991 | Brooks | 210/169 |
| 5,143,605 | 9/1992 | Masciarelli | 210/169 |

Primary Examiner—Peter Hruskoci
Assistant Examiner—Robert James Popovics
Attorney, Agent, or Firm—Brooks & Kushman

[57] ABSTRACT

A floatable stationary pool cleaner and method in cooperation with a pool recirculation system for removing circulating debris from the surface of a pool. The pool cleaner has a body having a generally scoop-shaped configuration. The body is generally hollow to form a conduit for water and the body has an open first end and a second end. A filter net is attachable to and cooperates with the second end for entrapping debris directed thereto. The filter net cooperates with the second end such that a portion of the filter net end is located slightly above the surface and a remainder of the filter net is located below the surface. Jets are provided which are connected to the hollow for propelling water away from the body in a direction to extend the scoop-shaped configuration of the body to increase the entrapment of debris and to propel water toward the second end to direct debris into the filter net.

14 Claims, 2 Drawing Sheets

5,264,122

STATIONARY SURFACE POOL CLEANER

TECHNICAL FIELD

This invention relates to pool cleaners and more particularly to floatable pool cleaners which are stationary and cooperate with the recirculation system of the pool.

BACKGROUND ART

Swimming pools and the like are under constant contamination from foreign matter such as leaves, twigs, bugs, hair, etc. which are introduced into the pool by trees, swimmers, wind, and articles which are used in and around the pool.

The majority of this foreign matte which enters into the pool tends to float on or about the surface of the pool for several hours before becoming water-logged and sinking to the bottom. It has been shown, that because of the foreign matter's tendency to remain at the surface for such an extended period of time, that seventy-five (75%) of pool contaminants are within the top six inches of water.

Traditionally, foreign matter was allowed to sink to the bottom before it was removed by various forms of pool vacuum cleaners or allowed to clog pool skimmers (overflow) as it was drawn into the recirculation system. Examples of pool vacuum cleaners are disclosed in product literature from Polaris ® which discloses the VAC SWEEP 180, the KREEPY KRAULY ® SYSTEM, Aquanaunt, Inc.'s AQUADROID ®, and Arneson Products, Inc.,s POOL VAC ®. These devices require the debris to sink to the bottom of the pool before the debris can be removed by vacuuming.

Alternatives to bottom moving vacuum cleaners, are devices which are either stationary or mobile which have at least one water whip which sweeps submerged surfaces of the pool. Examples of such devices are disclosed in U.S. Pat. No. 3,860,518 to Henricksen, issued Jan. 14, 1975, and Arneson Product, Inc.'s POOL SWEEP ® I and II. Such devices require a booster pump to increase the water pressure in the pool's recirculation system to drive the water whips, thereby greatly increasing the cost of pool cleaning.

U.S. Pat. No. 4,994,178 to Brooks, issued Feb. 19, 1991, discloses a heavier-than water pool cleaning device which has a floatable body propelled about the surface of the pool by the recirculation system while a water whip having a filter bag attached to its free end travels about the pool floor and walls. This device cleans debris only when it has reached the bottom of the pool.

U.S. Pat. No. 4,746,424 to Drew, issued May 24, 1988, discloses a floating swimming pool cleaner which is propelled about the surface of the pool. Debris drawn by suction into the device is either trapped within a basket below the device or withdrawn from the pool through a standard pool vacuum hose. In this configuration, the device may easily become jammed or clogged which may result in serious damage to the pool recirculation system. In addition in this configuration, the device is incapable of trapping larger objects such as twigs which commonly get blown into a pool.

Examples of stationary pool cleaners are disclosed in U.S. Pat. Nos. 4,089,074, issued May 16, 1978 and 4,053,412, issued Oct. 11, 1977, to Sermons and Stix, respectively. These devices are located adjacent the water circulation drain to passively collect debris in the surface flow. These devices do not actively entrap debris by the use of water jets and rely exclusively on the directional surface flow resulting from the recirculation system of the pool.

The present invention incorporates many of the known benefits of pool cleaners while improving on the ease and cost of use and reducing the amount of time necessary to remove debris from the surface flow of a pool.

SUMMARY OF THE INVENTION

An object of the present invention is to provide an improved pool cleaner which removes debris from the surface flow of the pool.

Another object of the present invention is to provide a pool cleaner which is relatively inexpensive to produce and maintain.

An additional object of the present invention is to provide a pool cleaner which requires little installation or labor costs.

A further object of the present invention is to provide a pool cleaner which enables early, easy removal of surface debris.

Still another object of the present invention is to provide a pool cleaner which propels water to enhance surface flow in a desired direction to actively ingest or redirect surface water to entrap and retain debris from surface flow.

Another object of the present invention is to provide a pool cleaner which cooperates with normal return pressure of the recirculation system of the pool to actively entrap and retain debris from the surface flow.

A further object of the present invention is to provide a pool cleaner which does not require a booster pump or other such mechanism to clean debris from the surface flow of a pool.

A specific object of the present invention is to provide a floatable pool cleaner which cooperates with a pool recirculation system for removing circulating debris from the surface of a pool. The pool cleaner has a body having a generally scoop-shaped configuration. The body is generally constructed of hollow tubing which forms a conduit for water and the body has an open first end and a second end. A filter net is attachable to and cooperates with the second end for entrapping debris directed thereto. The filter net cooperates with the second end such that a portion of the filter net end is located slightly above the surface and a remainder of the filter net is located below the surface. A supply means is provided to supply water to the conduit of the body. A first jet is provided which is in fluid communication with the body and located at the open first end for propelling water away from the body in a direction to extend the scoop-shaped configuration of the body to increase the entrapment of debris. A second jet is provided which is also connected to the hollow and located along the body in between the open first end and the second end. The second jet is configured to propel water toward the second end to direct debris into the filter net. A retaining means is provided to retain the body within the pool at the desired location.

Another specific object of the present invention is to provide a method of entrapping debris from the surface flow of a pool with a cleaner. The first step is to stationarily position the cleaner within the pool to receive the surface flow; next, to propel water away from the cleaner against the surface flow to limit the bypassing of the cleaner by debris. The propelling of water also assists in channeling the debris into the cleaner; then propelling water in a direction with the surface flow to entrap the debris channeled from the surface flow.

The above objects and other objects, features, and advantages of the present invention are readily apparent from the following detailed description of the best modes for carrying out the invention when taken in connection with the accompanying drawings.

BEST MODE FOR CARRYING OUT THE INVENTION

Figure 1:
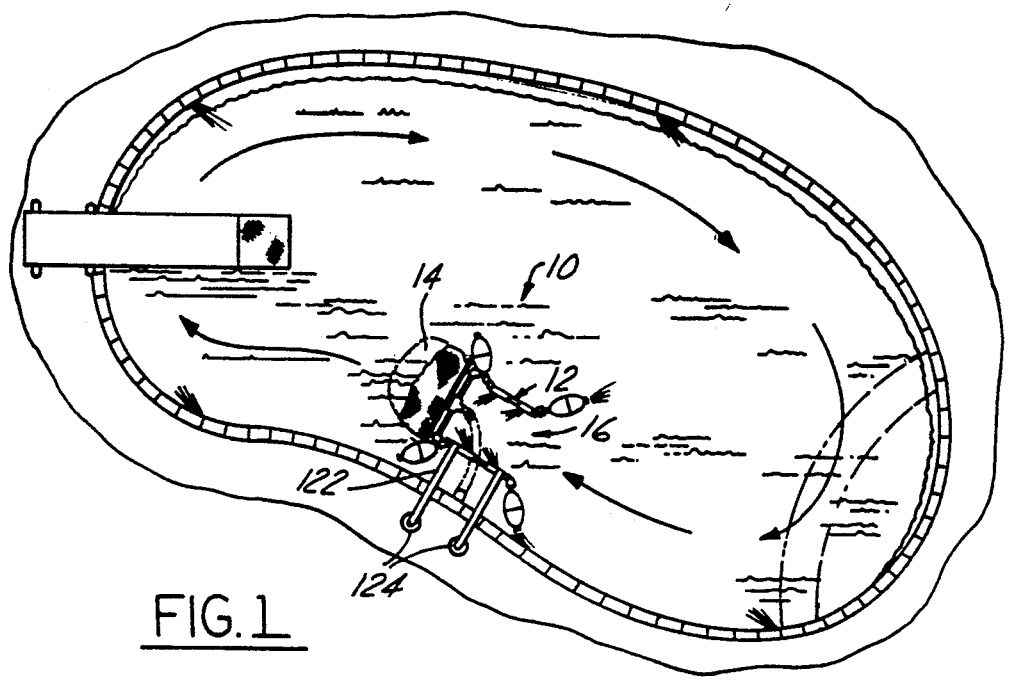
FIG. 1 is a plan view of the pool cleaner in a pool as positioned during use in accordance with the present invention.

The preferred embodiment as shown in FIGS. 1-6, illustrates a pool cleaner, generally indicated at 10. The cleaner 10 has a body, generally indicated at 12 and a filter net generally indicated at 14.

The body 12 has a generally scoop-shaped configuration. The scoop-shaped configuration of the body 12 has an open first end 16 and a second end 18. The scoop shape is formed by a first member 20 and a second member 22 which form the sides of the scoop shape. The scoop shape is completed by a third member 24 interposedly connecting the first member 20 and the second member 22.

The first, second and third members, 20,22 and 24, respectively, are constructed of a hollow PVC tubing such as Jet Stream TM SCH 40 PVC 1120. At the open first end 16 of the first member 20 and the second member 22 are first elbow members 26 and 28 respectively. The elbow members are constructed of hollow PVC such as LASCO TM SCH 40. The first elbow members 26 and 28 are located so as to enable first extension pieces 30 and 32 to be affixed perpendicular to the first elbow members 26 and 28 respectively. The extension pieces are constructed of the same material as the first member. Second elbow members 34 and 36 are rotatably affixed to first extension pieces 30 and 32 respectively so as to allow second extension pieces 38 and 40 to be attached in a plane generally parallel to the first and second members 20 and 22. Interposed between the second elbow members 34 and 36 and the second extension pieces 38 and 40 are first adapter pieces 39 and 41 which allow the second extension pieces 38 and 40 to be of slightly smaller circumference than the first extension pieces 30 and 32. The second elbow members 34 and 36 are rotatable about the first extension pieces 30 and 32 to enable the second elbow members 34 and 36 to be oriented outward from the body 12 at an angle of approximately 45°. Attached to the second extension pieces 38 and 40 respectively are first floats 46 and 48 respectively. An end cap 49 is fitted into the open first end 16 of the first and second members 20 and 22 to retain floats 46 and 48. The floats used in this embodiment, are conventional floats such as those made by LIFEGUARD ®.

Figure 3:
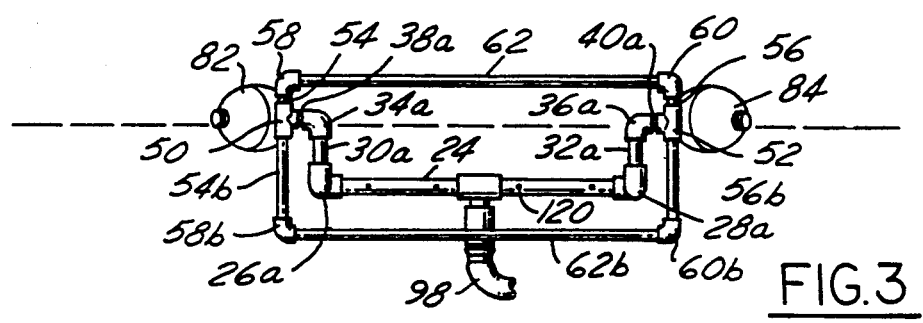
FIG. 3 is an end view of the device taken along line 3—3 of FIG. 2 and with the filter net removed.

As best shown in FIG. 3, located at the second end 18 of the first and second members 20 and 22 is a similar construction to that at the open first end 16 of the first and second members 20 and 22. The same elements appearing at the second end 18 of the first and second members 20 and 22 have corresponding number designations as at the open first end 16 with the addition of an associated letter designation "a" corresponding to the first member 20 and the second member 22 respectively to avoid confusion between the open first end 16 and the second end 18.

With continuing reference to FIG. 3, a major difference between the open first end 16 and the second end 18 is that the second elbow members 34a and 36a are oriented at 90° away from the body 12. Also, the second extension pieces 38a and 40a respectively are attached to first T pieces 50 and 52 respectively. The first T pieces 50 and 52 are affixed so that they are located parallel to first extension pieces 30a and 32a respectively. Third extension pieces 54 and 56 are respectively attached to project upwardly from the first T pieces 50 and 52. Third elbow members 58 and 60 are affixed to the third extension pieces 54 and 56 respectively such that the third elbow members 58 and 60 have an orientation toward the body 12 directly opposite the orientation of second elbow members 34a and 36a. Interposed between the third elbow members 58 and 60 is a fourth member 62. The structure below the first T pieces 50 and 52 is the mirror image of the structure above the first T pieces 50 and 52. The same elements appearing below the first T pieces have the same numeral designation as those elements appearing above the first T pieces 50 and 52. An additional letter designation "b" is utilized to avoid confusion between the structure above the first T pieces 50 and 52 and the structure below the first T pieces 50 and 52.

Figure 4:
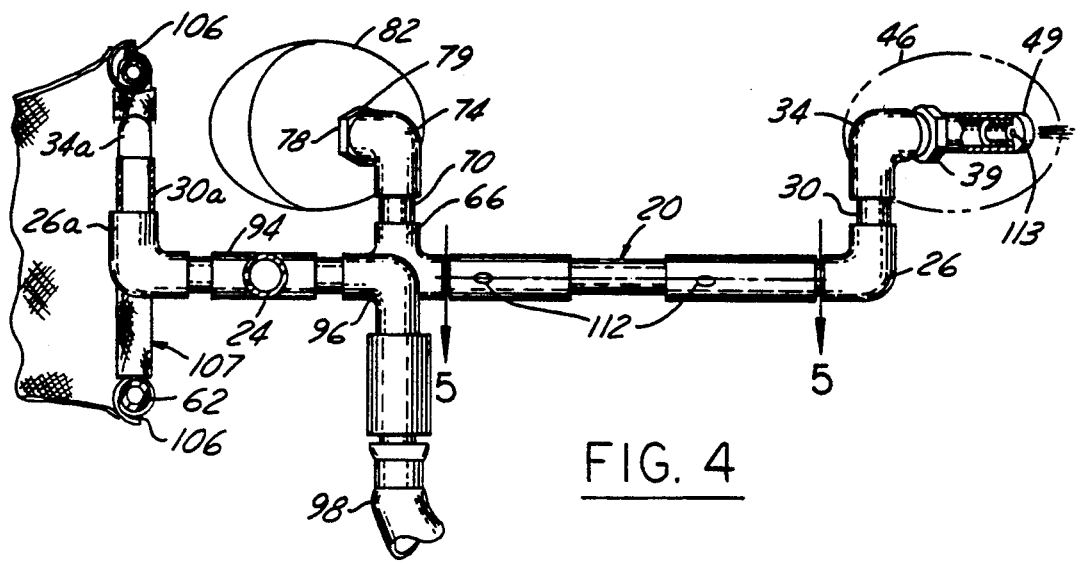
FIG. 4 is a side view, partially in cross-section of the device taken along line 4—4 of FIG. 2.

Referring now to FIG. 4, located along first member 20 and second member 22 are second T pieces 66 and 68 located on the first member 20 and the second member 22 respectively. The second T pieces 66 and 68 are oriented such that fifth extension pieces 70 and 72 located within the second T pieces respectively are perpendicular to the first and second members 20 and 22 respectively. Fourth elbows members 74 and 76 are oriented at approximately 45° outward from the body 12 toward the second end 18. Sixth extension pieces 78 and 80 extend outward from the body 12 and cooperate with second floats 82 and 84. Second adapter pieces 79 and 81 are interposed between the fourth elbow members 74 and 76 and the sixth extension pieces 78 and 80 to enable the sixth extension pieces 78 and 80 to have a slightly smaller circumference to accommodate floats 82 and 84.

Figure 6:
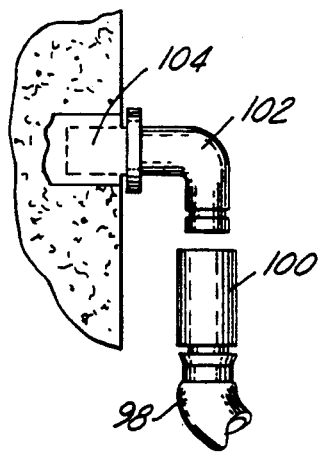
FIG. 6 is a fragmentary drawing of the device showing the attachment of the hose to the pool outlet port.

Located adjacent the first elbow members 26a and 28a are third T pieces 90 and 92 respectively. The third T pieces are oriented such that they face toward each other to enable third member 24 to be affixed therebetween. Located along third member 24 is a fourth T piece or supply means 94 which provides water to the body 12. The supply means 94 cooperates with a first quick release fitting 96 for attaching a hose 98 to the body. As shown in FIG. 6, the hose 98 has a second quick release fitting 100 located at its opposite end for cooperation with an outlet fitting 102. The outlet fitting 102 cooperates with a recirculation outlet 104 of the pool recirculation system. It is water from the pool recirculation system which, in this embodiment, provides water to the pool cleaner 10. In an alternative embodiment, the hose 98 can cooperate with an external water supply such a garden hose to obtain the necessary water for the pool cleaner 10.

The filter net 14 has a mesh configuration which is sufficiently small so as to trap and retain silt and the like. The filter net 14 mesh maybe as fine as a nylon stocking, so long as it is capable of trapping silt and debris while being porous to allow surface flow to escape. The invention is not limited to use with a filter net 14 of such fine mesh. It is also capable of use with a filter net of larger mesh if entrapment of only large objects is desired. The filter net 14 is removably affixed to the body 12 by Velcro ® 106 affixed to an open net end 107 so as to substantially surround and removably attach the open net end 107 to the fourth members 62 and 62b as well as the third extension pieces 54, 54b and 56, 56b, such that the open net end 107 constantly remains open. The filter net 14 is configured such that the open net end 107 remains open whereas a closed net end 109 is closed to retain debris entrapped within the filter net 14.

A first set of water jets 108 and 110 are located at free ends of the second extension pieces 38 and 40 respectively. The end cap 49 has an aperture 113 which directs water propelled from the body 12. As shown in FIG. 4, the first jets 108 and 110 propel water obtained through the supply means 94 outward away from the body 12 at an angle of approximately 45°. The water that is propelled from the first jets 108 and 110 extends the scoop-shaped configuration of the body 12 to increase the entrapment of debris. However, only one first jet 108 or 110 is required, and the other first jet 108 or 110 is utilized to increase efficiency of the cleaner 10.

Figure 5:
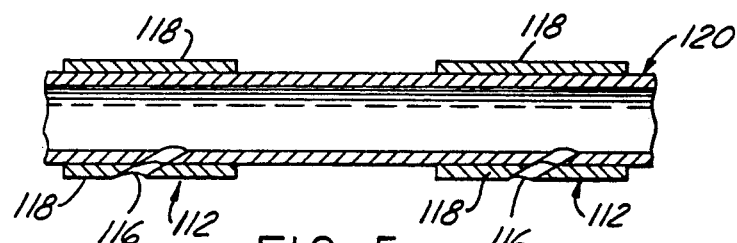
FIG. 5 is a fragmentary cross-section of the device taken along line 5—5 of FIG. 4.

A second set of water jets 112 and 114 are located interposed between the open first end 16 of the body 12 and the second end 18, along the first and second members 20 and 22 respectively. The second jets 112 and 114 propel water back toward the second end 18 at an angle of approximately 45° and propel water upward toward the surface at an angle of 45°. This results in surface ripple to improve movement of debris toward the filter net 14. It also causes some non-surface water and debris to be driven upward into the surface flow resulting in increased cleaning capacity. As shown in FIG. 5, the second jets are formed from apertures 116 located in the first and second members 20 and 22 respectively. A reinforcement 118 surrounds the aperture 116 to thicken the first and second members 20 and 22 respectively to assist in propelling water in the desired direction. The aperture 116 extends through the reinforcement 118 adding to the thickness of PVC tubing through which the water being propelled must travel. This added thickness assists in directing the propelled water at the desired location. In this embodiment, two second water jets 112 and 114 are located on each of the first and second members 20 and 22. However, only one such second jet 112 and 114 is required to perform the task. The additional number of second jets 112 and 114 are used for increased efficiency.

A third set of water jets 120 are located along the fourth member 24 for propelling water into the filter net 14. In this embodiment, four third jets 120 are located along the fourth member 24. The third jets 120 are oriented such that a few jets propel water not only in the same direction as the surface flow but also upward at an angle of approximately 45° to cause water ripple. The result is that debris is retained in the filter net 14 both on and below the surface of the water. It is possible however to entrap and retain debris within the filter net 14 without the use of the third jets 120 or reduce the number thereof. As an alternative to, or in conjunction with the third jets 120, a weir door or gate (not shown) may be used to retain debris trapped within the filter net 14. The weir door is a one-way pivot door which allows surface flow and debris to enter into the filter net 14, but prevents the debris from backing out of the filter net if the recirculation system of the pool is turned off or completed.

As best shown in FIG. 1, restraining straps 122 are affixed to the body 12 to stationarily position the cleaner 10 at the desired location within the pool. In the embodiment shown in FIG. 1, the straps 122 cooperate with a deck weight to secure the straps on the pool deck to position the pool cleaner 10 in the desired location.

Figure 7:
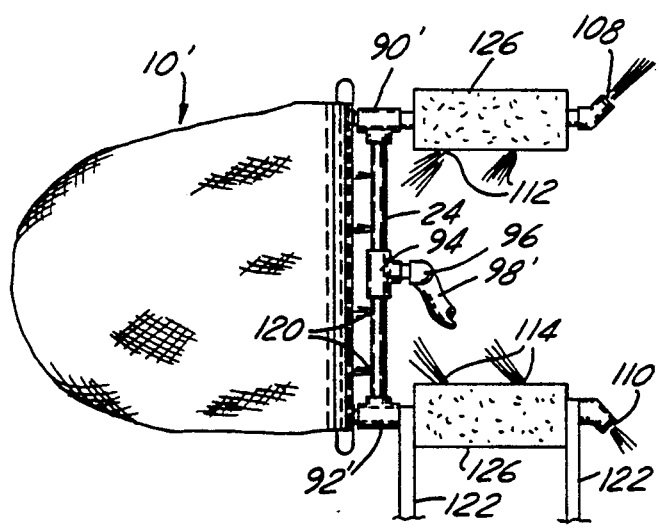
FIG. 7 is a plan view of an alternative embodiment of the present device.

An alternative embodiment shown in FIG. 7, illustrates a different method of floatingly supporting a cleaner 10'. Here, a Styrofoam block 126 is utilized. The block 126 cooperates with the second jets 112' and 114' to allow water to be propelled in the desired direction. The blocks 126 are positioned on the body 12 such that the open net end 107 is positioned partially above the surface and partially below the surface to ensure that debris within the surface flow is entrapped within the cleaner 10.

Figure 2:
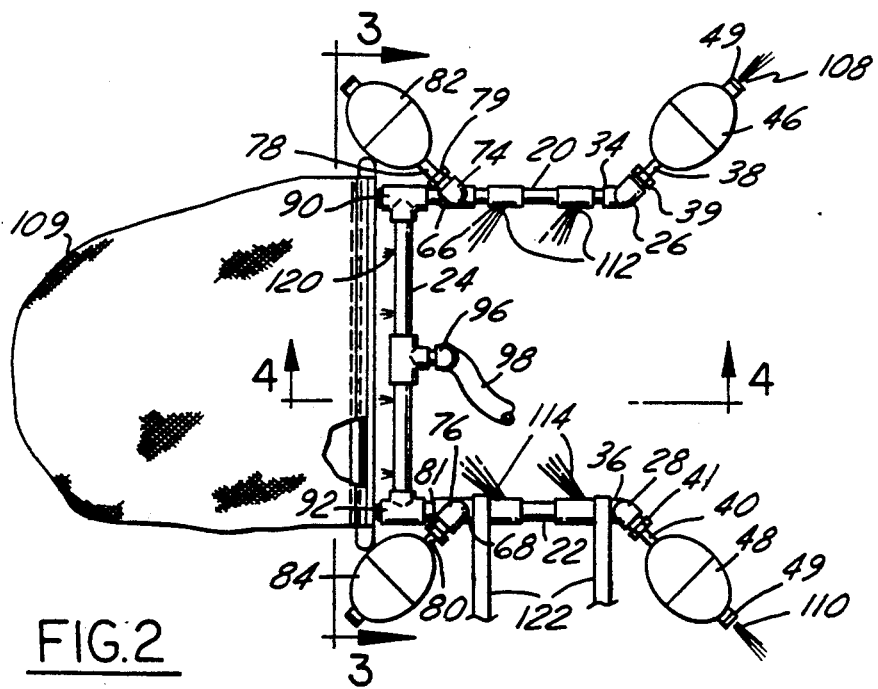
FIG. 2 is an enlarged plan view of the device similar to that shown in FIG. 1, showing the major features of the device as oriented in the pool.

In operation, the recirculation system in a pool, represented in FIG. 1 by directional arrows, causes the water to flow in a uniform direction about the pool. The pool cleaner 10 is placed within the pool so as to receive the surface flow of water. As shown in FIGS. 2 and 3, the floats 46,48 and 82,84 are positioned on the body 12 to ensure that the open net end 107 is situated partially above and partially below the surface X of the water. This positioning is accomplished by the length of the first extension pieces 30, 30a and 32,32a, which determine the height of the floats 46,48,82 and 84 are above the body 12. The outlet fitting 102 is attached to one of the outlet ports 128. The hose 98 is attached to outlet fitting 102 by means of the second quick release fitting 100. The other end of the hose 98 is attached to the supply means 94 by the first quick release fitting 96. Water then travels from the outlet port 128 through the hose 98, the supply means 94 into the hollow body 12. In an alternative embodiment, water may be supplied from an external water source such as a garden hose.

The water within the body 12 is propelled in the desired directions by the first, second and third water jets, 108, 110, 112, 114, and 120 respectively. The water jets 108, 110, 112, 114, and 120, in combination with the recirculation system of the pool result in debris being entrapped from the surface water and retained within the filter net 14 which filters even the smallest particles of silt and debris from the surface flow.

While the best modes for carrying out the invention have been described in detail, those familiar with the art to which this invention relates will recognize various alternative designs and embodiments for practicing the invention as defined by the following claims.

What is claimed is:

1. A floatable pool cleaner cooperating with a pool recirculation system for removing circulating debris from the surface of a pool, said pool cleaner comprising:

a body having a generally scoop-shaped configuration in the plane of the surface to gather debris circulated thereto by said system for directing debris to be entrapped, said body being generally hollow to form a conduit for water and said body having an open first end and a second end;

a filter net attachable to and cooperating with said second end for entrapping debris directed thereto, said filter net having an open net end adjacent said second end and said filter net having a closed net end projecting away from said second end, said open net end cooperating with said second end such that a portion of said open net end is located slightly above the surface and a remainder of said open net end is located below the surface;

a water supply inlet connectable to a water outlet of the pool recirculation system for supplying water to said hollow body;

a first jet means connected to said hollow body and arranged to direct a flow of water along the surface of the water and located at said open first end for propelling water away from said body in a direction to extend said scoop-shaped configuration of said body to increase the entrapment of debris;

a second jet connected to said hollow body and located along said body interposed between said open first end and said second end and configured to propel water toward said second end to direct debris into said filter net; and retaining means for removably attaching said body to a side wall of a pool to be cleaned.

2. The pool cleaner of claim 1 including a hose means having a first attachment means for attachment to a water source and a second attachment means for connecting said hose means to said supply means.

3. The hose means of claim 2 wherein said first attachment means comprises a quick-release fitting with said water source.

4. The hose means of claim 2 wherein said second attachment means comprises a quick-release fitting with said supply means.

5. The pool cleaner of claim 1 further including a third jet connected to said hollow and located along said second end of said body for propelling the water directed theretoward by said second jet into said filter net to entrap and retain said debris.

6. The pool cleaner of claim further including float means cooperating with said body for floatingly supporting said body adjacent the surface in a manner to ensure that said open net end of said filter net is partially submerged to entrap debris floating above and below the surface.

7. The pool cleaner of claim 1 wherein said filter net comprises openings sufficiently small to entrap silt.

8. A floatable pool cleaner adapted to be stationary with respect to circulating water in a pool for removing debris from a surface of said circulating water, said pool cleaner comprising:

a generally scoop-shaped body constructed and arranged to be stationarily positioned along the side of said pool, said body formed of a generally hollow tubular frame forming a conduit for water and said body having an axially aligned open first end and a second end, said open first end adapted to receive water circulating within the pool and configured to direct debris carried by the water toward said second end;

a filter net attachable to and cooperating with said second end for entrapping debris directed thereto, said filter net having an open net end adjacent said second end and said filter net having a closed net end projecting away from said second end, said open net end configured such that when said pool cleaner is placed in the water a portion of said open net is located slightly above the water and a remainder of said open net end is located below the water;

a water supply inlet connectable to a water outlet of the pool recirculation system for supplying water to said hollow body;

a first jet means connected to said hollow body and arranged to direct a flow of water along the surface of the water and located at said first open end for propelling water away from said body in a direction to extend said scoop-shaped configuration of said body to increase the entrapment of debris;

a second jet connected to said hollow body and located along said body interposed between said first open end and said second end and configured to propel water toward said second end to direct debris into said net; and retaining means for removably attaching said body to a side wall of a pool to be cleaned.

9. The pool cleaner of claim 8 including a hose means having a first attachment means for attachment to a water source and a second attachment means for connecting said hose means to said supply means.

10. The pool cleaner of claim 9 wherein said filter net comprises a mesh sized to entrap and retain debris of various sizes including but not limited to silt.

11. The supply means of claim 8 wherein said first attachment means comprises a quick-release fitting with said water source.

12. The supply means of claim 8 wherein said second attachment means comprises a quick-release fitting with said supply means.

13. The pool cleaner of claim 8 further including a third jet connected to said hollow and located along said second end of said body for propelling the water directed theretoward by said second jet into said filter net to entrap and retain said debris.

14. The pool cleaner of claim 8 further including float means cooperating with said body for floatingly supporting said body adjacent the surface in a manner to ensure that said open net end of said filter net is partially submerged to entrap debris floating above and below the surface.

* * * * *

UNITED STATES PATENT AND TRADEMARK OFFICE
CERTIFICATE OF CORRECTION

PATENT NO. :       5,264,122
DATED       :       November 23, 1993
INVENTOR(S) :      George Lakotish It is certified that error appears in the above-identified patent and that said Letters Patent is hereby corrected as shown below:

Column 1, Line 15 (Appln. Page 1, Line 15), after "foreign" replace "matte" with --matter--.

Column 1, Line 31 (Appln. Page 2, Lines 2-3), after "Products," replace "Inc.,s" with --Inc.'s--.

Column 3, Line 9 (Appln. Page 6, Title), after "DRAWINGS" delete --FIG.--.

Column 3, Line 10 (Appln. Page 6, Line 1), before "1" insert --FIG.--.

Column 7, Line 49, Claim 6 (Appln. Page 16, Line 20, Claim 6), after "claim" insert --1--.

Signed and Sealed this

Twenty-first Day of June, 1994

Attest:

BRUCE LEHMAN

*Attesting Officer*      *Commissioner of Patents and Trademarks*